(12) United States Patent
Sathe et al.

(10) Patent No.: US 7,437,275 B2
(45) Date of Patent: Oct. 14, 2008

(54) SYSTEM FOR AND METHOD OF MULTI-LOCATION TEST EXECUTION

(75) Inventors: Abhay Sathe, Fort Collins, CO (US); Thomas G. Bartz, Loveland, CO (US); Nimal Gamage, Fort Collins, CO (US); David E. Bingham, Fort Collins, CO (US); Carolyn Darbie, Fort Collins, CO (US); Stephen C. Booth, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 442 days.

(21) Appl. No.: 11/264,896

(22) Filed: Nov. 1, 2005

(65) Prior Publication Data
US 2007/0033441 A1 Feb. 8, 2007

Related U.S. Application Data

(63) Continuation-in-part of application No. 11/195,978, filed on Aug. 3, 2005, and a continuation-in-part of application No. 11/195,979, filed on Aug. 3, 2005, now Pat. No. 7,203,625.

(51) Int. Cl.
*G06F 15/00* (2006.01)
(52) U.S. Cl. .................... 702/189; 709/224
(58) Field of Classification Search ................ 702/108, 702/121, 122, 123, 189; 714/38, 43; 709/203, 709/217, 224; 713/201
See application file for complete search history.

(56) References Cited

U.S. PATENT DOCUMENTS

| | | | |
|---|---|---|---|
| 6,154,128 A | 11/2000 | Wookey et al. | |
| 6,467,002 B1 | 10/2002 | Yang | |
| 6,684,280 B2 | 1/2004 | Chauvel et al. | |
| 6,711,607 B1 | 3/2004 | Goyal | |
| 7,203,625 B2 * | 4/2007 | Bingham et al. | 702/189 |
| 2002/0065911 A1 * | 5/2002 | von Klopp et al. | 709/224 |
| 2003/0115252 A1 * | 6/2003 | Boudnik et al. | 709/202 |
| 2003/0233439 A1 | 12/2003 | Stone et al. | |
| 2004/0033806 A1 | 2/2004 | Daniel et al. | |
| 2004/0103153 A1 | 5/2004 | Chang et al. | |

(Continued)

FOREIGN PATENT DOCUMENTS

WO WO9952234 A1 10/1999

(Continued)

OTHER PUBLICATIONS

"Agilent OSS QoS Manager, Concepts Guide"; Agilent Technologies, Inc. 2005; Tenth edition, Nov. 2005; pp. I-1 through V-13.

*Primary Examiner*—Bryan Bui

(57) ABSTRACT

Methods, systems and computer program products for performing multi-location execution of tests between or among multi-sided test components in a wireless environment are described. Multiple flows are initiated substantially simultaneously and concurrently executed. A graphical representation of a multi-flow test is created that permits synchronization of the flows among agents at multiple remote locations. The graphical representation is converted into a textual representation in an open communication standard format, and information regarding each flow involved in the test is ascertained. The flows are substantially simultaneously initiated and concurrently executed with synchronization and dynamic data exchange components.

20 Claims, 14 Drawing Sheets

U.S. PATENT DOCUMENTS

| | | |
|---|---|---|
| 2004/0226015 A1 | 11/2004 | Leonard et al. |
| 2005/0034126 A1 | 2/2005 | Moore |
| 2005/0060360 A1 | 3/2005 | Doyle et al. |
| 2005/0091654 A1 | 4/2005 | Lection et al. |
| 2005/0149610 A1 | 7/2005 | Brooks et al. |
| 2005/0177600 A1 | 8/2005 | Eilam et al. |
| 2005/0188089 A1 | 8/2005 | Lichtenstein et al. |

FOREIGN PATENT DOCUMENTS

| | | |
|---|---|---|
| WO | WO0171498 A2 | 9/2001 |

* cited by examiner

SYSTEM FOR AND METHOD OF MULTI-LOCATION TEST EXECUTION

CROSS-REFERENCE TO RELATED APPLICATIONS

This application is a continuation-in-part of, and claims the benefit of priority to U.S. patent application Ser. No. 11/195,978, filed 03 Aug. 2005 and entitled "Multisided Synchronization of Execution in a Wireless Test Environment", and application Ser. No. 11/195,979, now U.S. Pat. No. 7,203,625, filed 03 Aug. 2005 and entitled "Multisided Sharing of Dynamic Data in a Wireless Test Environment", the contents of each of which are hereby incorporated by reference.

BACKGROUND OF THE INVENTION

The present invention relates to an method, system and computer program product for componentized multi-location software testing, and more particularly to an apparatus, system and method for synchronization and dynamic data management between multi-sided test flows of components at remote locations, typically representing separate participants or clients in a transaction, conversation or joint session offered by a communications service.

The term 'test software' is used to describe a software product whose primary function is to examine how a system is functioning. The test software collects its input from agents, which are individual members of a system being tested.

Some examples where test software is employed include mobile or wireless phone networks and other types of telecommunication networks or systems, river water quality monitors and automobile performance test systems. Networks or systems are often geographically and/or temporally distributed. The test software for such systems must collect data from different locations or at different times to test such a system.

Despite the many advances that have been made in the field of wireless network testing, certain problems persist. These problems include an inability to synchronize the execution of test flows between or among flows or sides in an open manner that employs common standards, an inability to synchronize execution between flows (or virtual threads of execution) except when using a proprietary interface, and an inability to test wireless services that depend on orders of execution between flows unless a proprietary interface is included in the system architecture.

Test and measurement software products such as Agilent's OSS Wireless QOS Manager (WQM) are used for testing wireless (Mobile/Cell/WiFi) communications networks, and the applications that the networks provide to the users of such networks. Examples of such applications are: 1) sending and receiving short messages (SMS), which involves a message 'sender' and a message 'receiver' who may be located anywhere in the world; and 2) a 'push to talk' application which involves one 'sender' (a wireless device) which is used for sending a voice message to a group of 'listeners'. The listeners are a group of wireless devices that are registered to listen to the message, which will receive the message, or a notification of the message in some form (a short message or an email.) The following publication and patent application, each hereby incorporated by reference herein in its respective entirety, disclose various prior art teachings concerning WQMs:

Agilent Technologies, Inc. Concepts Guide entitled "Agilent OSS QoS Manager" tenth edition, November 2005, part number J7810G-90001, and U.S. patent application Ser. No. 10/736,835 entitled "Sequential Coordination of Test Execution and Dynamic Data" to Bingham.

The testing of heterogeneous (multi-network and multi-protocol) applications is accomplished by running many test software programs, at remote locations, concurrently. Each of the concurrent software programs tests one aspect of the wireless application under test. For example, in the 'push to talk' application described above, one software test program will be used to send the message and measure different quality aspects of the wireless applications seen when sending the message. On the receivers' side, many test programs, located at different locations, will be employed to receive the message, and measure the quality aspects of the wireless network when receiving the message. With reference to FIG. 1, WQM allows creation of software test programs with components that run in sequence. These sequences of software test components can be run at any remote location using control programs called 'Agents'. Heretofore, agents have not provided any ability to run multiple sequences concurrently, or the ability to synchronize such sequences.

Existing test systems capable of running such software tests concurrently depend upon proprietary software written in a specially created language. Some systems use proprietary protocols built upon open standard protocols. As long as the implementation details (e.g., specialized software 'library' for concurrency and synchronization) of such protocols are not available freely, such protocols cannot be considered platform independent, nor multithreaded. In systems that have a centralized implementation, a single point of failure, i.e., failure of a single component can cause the entire test system to stop functioning.

Thus, what is desired is a wireless QOS test system manager that is not dependent on proprietary hardware, and uses open software protocols to achieve concurrency and synchronization.

As those skilled in the art will appreciate after having read and understood the non-limiting descriptions below, at least some of the systems, methods and computer program products disclosed may be modified advantageously in accordance with the teachings of the present invention.

SUMMARY OF THE INVENTION

Methods, systems and computer program products forming multi-location execution of multi-sided tests between or among multi-sided test components testing in a communication or test environment having at least a first flow at a first remote location and a second flow at a second remote location, such as a wireless telecommunication environment, are disclosed. The multiple, remote flows in a system such as a wireless test configuration are initiated substantially simultaneously. A graphical representation is created of a multi-flow test that synchronizes the multiple flows among agents at multiple remote locations, which is then converted into a textual representation in an open communication standard format. The textual representation is read in order to identify the flows and their associated locations, the resources required to execute the flows, and the remote locations of the agents that control the resources required to execute the flows. A test controller sends to test session servers, which in a preferred embodiment comprise Java servlets, at the respective locations descriptions of the sequences of tests comprising the corresponding flows in an open communications standard format, and further substantially simultaneously initiates, synchronizes and returns test results derived from the concurrent execution of the multiple flows.

In one embodiment, synchronization is achieved by sending control messages between or among multi-sided test components comprising the flows that permit the flows to implicitly exchange timing synchronization information and dynamically-generated data. For example, in one method execution is paused in at least one of the flows. From the flow not paused, a synchronization signal is sent to a sync server in the test controller. The paused flow requests and awaits permission from the sync server to resume flow. The paused flow is resumed upon receiving a synchronization signal from the sync server.

In another embodiment, dynamically generated data are shared or transferred between or among agents using dynamic data content servers that employ open communication standards or protocols, such as HTTP or HTTPS. The present invention includes within its scope the methods of sharing or transferring dynamically generated data described above and below, as well as systems and test agents capable of carrying such methods. Dynamic data are shared or transferred between or among multi-sided test components in a wireless environment having at least a first flow on a first side and a second flow on a second side. The method comprises generating, in at least one of the first flow and the second flow, dynamic data; posting, using at least one open common communication standard, the dynamic data to a dynamic content server to form posted dynamic data; requesting, from at least one of the first flow and the second flow to the dynamic content server, the posted dynamic data; sending, from the dynamic content server, the posted dynamic data to the flow requesting the posted dynamic data. The posted dynamic data stored in the dynamic content server may also be subjected to "enter," "get," "remove" and/or "replace" instructions effected by means off the aforementioned open common communication standard.

In a preferred embodiment, one or more performance measure of a service under test is generated from the multi-location test results.

Various embodiments of the present invention may be characterized by one or more of the following aspects:

(a) Software executable to perform the methods in accordance with the invention does not require allocating special hardware prior to test execution, i.e., it is capable of running on off the shelf hardware;

(b) Such software is loosely coupled, meaning each part of the software system can be provided from different software systems;

(c) Systems according to the invention may be written in different languages, be built upon open common communication standard protocols such as, for example, HTTP, HTTPS, FTP and web servers, to synchronize separate test execution and data sharing between or among flows (or virtual threads of execution) and/or between multiple third-party applications, and can run on heterogeneous operating systems;

(d) Software elements of the inventive systems can be located anywhere on the Internet, and can be easily adapted to provide security, reliability and the ability to scale to handle a large number of concurrent synchronized software programs;

(e) Resource allocation may be done prior to scheduling tests, but is optional;

(f) The multi-threaded capabilities of host operating systems are utilized to enable dynamic sharing of data between test flows even while a test function may be blocked performing other tasks or awaiting this information;

(g) Synchronization and dynamic data exchange between or among multiple flows in a wireless service test is permitted, even if a proprietary interface is not employed in the system being tested;

(h) Dynamic data may be securely transferred or shared using an HTTPS protocol;

(i) Timeouts may be configured as required;

(j) The location of a sync server may be changed, which is useful for configurations having firewalls;

(k) Sync servers may be run on any Wireless QOS agent or on any web server that supports servers;

(l) If a synchronization event has lived beyond a configurable time, it is automatically deleted.

(m) Centralizing dynamic content, which permits all flows access to dynamic data whenever it is needed by a particular flow;

(n) Changing the location of one or more dynamic content servers, which is especially useful for configurations having firewalls;

(o) Running dynamic content servers on any Wireless QOS agent or on any web server;

(p) Automatically deleting posted dynamic data that have lived beyond a configurable time; and (q) Multiple tests accessing specific dynamic data simultaneously time based on unique identification provided for each requested test.

BRIEF DESCRIPTION OF THE FIGURES

For a better understanding of the present invention, together with other and further aspects thereof, reference is made to the accompanying drawings and detailed description, wherein.

DETAILED DESCRIPTION OF CERTAIN EMBODIMENTS OF THE INVENTION

System Architecture

Figure 1:
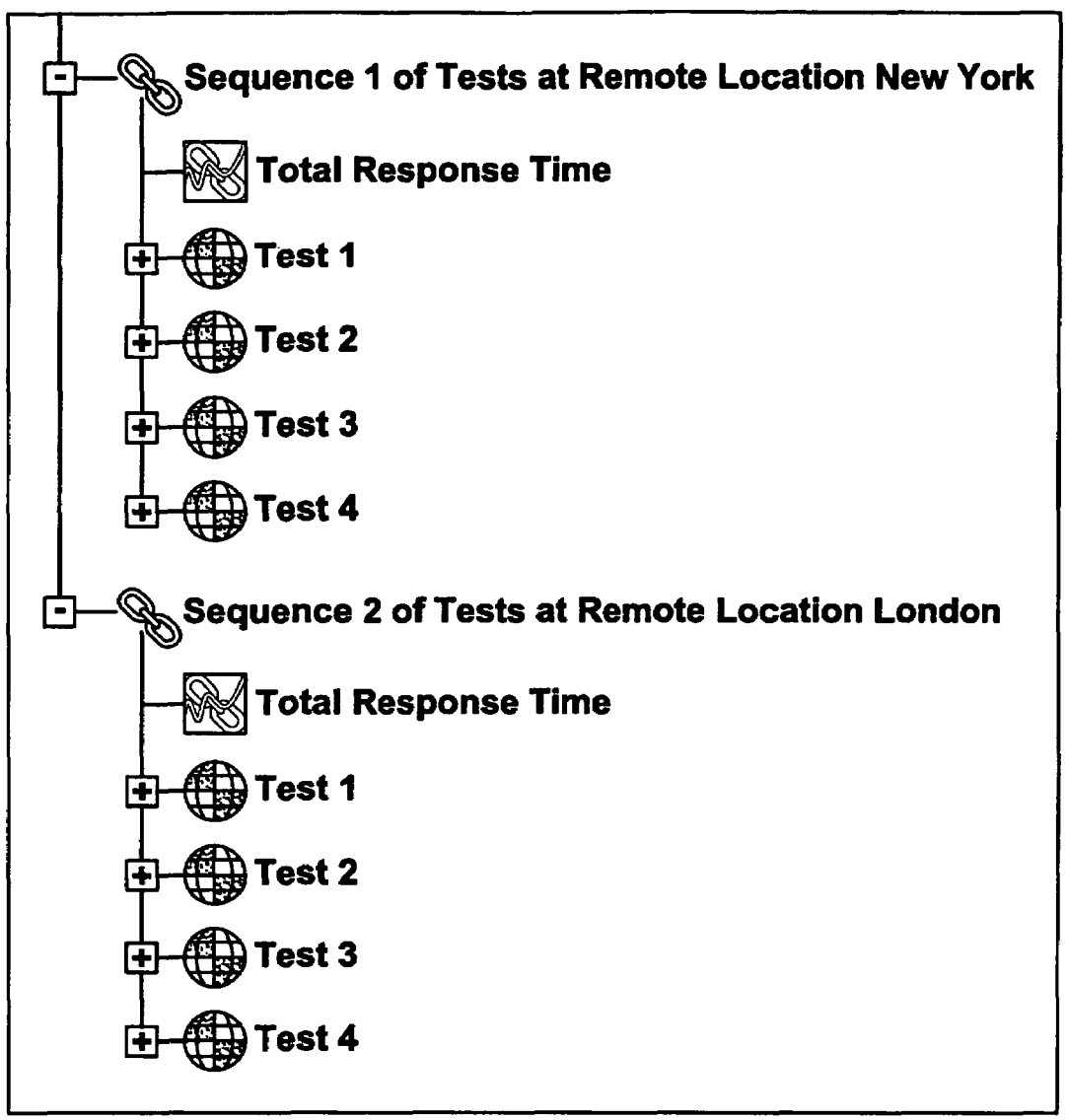
FIG. 1 is a graphical representation of two test sequences running at remote locations as created by an existing WQM system.
Figure 2:
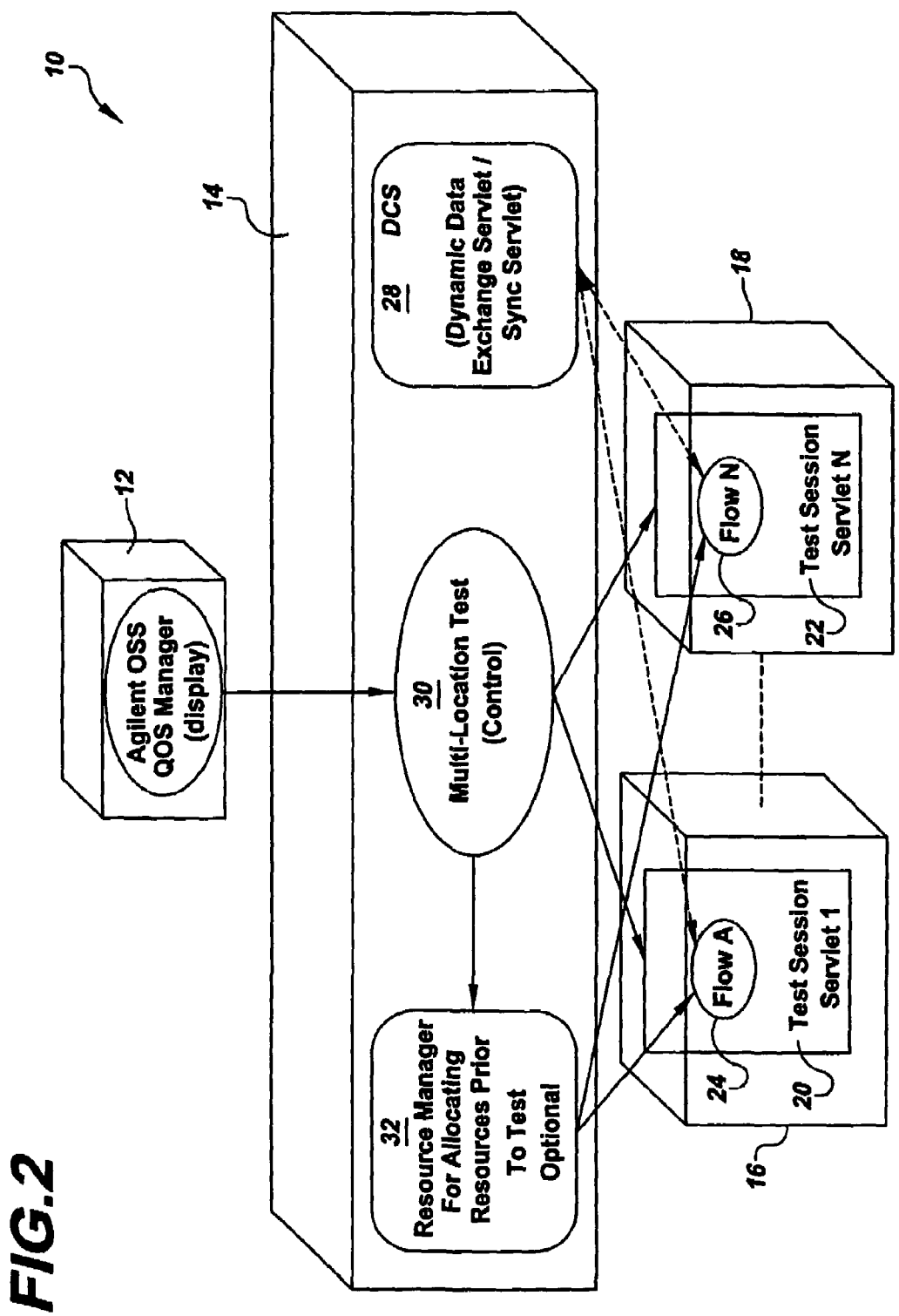
FIG. 2 is a block diagram of a test system in accordance with the present invention.

FIG. 2 illustrates a distributed multi-location test system 10 that allows a system administrator to administer, from a remote browser 12, automated multi-location testing via an active test controller 14 on remote computer processors 16, 18 located anywhere on the Internet. The system has distributed software components that are coordinated using open communication standard IP (Internet protocol) messaging, such as HTTP (hypertext transport protocol) messages (indicated by solid and broken pointer lines.) Operations of the multi-location test are viewable and established using the web browser, which in one embodiment comprises a WQM display. In the descriptions that follow, the terms "server" and "servlet" are used interchangeably, however such use is not intended to limit the invention to Java-based implementations, as the term servlet might otherwise connote. In fact, an advantage of the present invention is that it may be implemented in any variety of computer languages.

Figure 3:
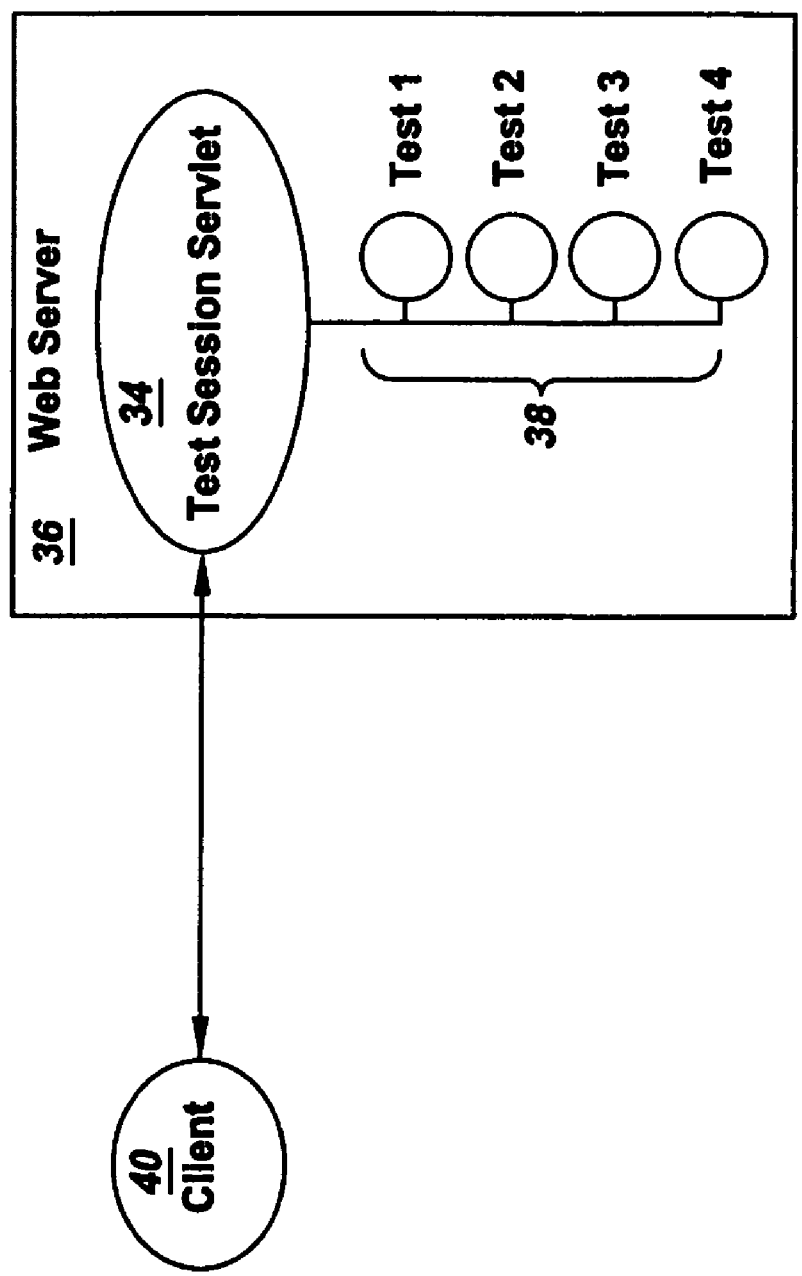
FIG. 3 is a block diagram illustrating a conventional relationship between a client, web server and test session server as in the prior art.

According to one implementation, system 10 includes software components located at the active test controller 14, including the multi-location test (MLT 30), a dynamic content server (DCS 28) that includes a data exchange server and a sync server, and an optional resource manager 32. The DCS 28, and an optional resource manager 32 are potentially located remotely from the MLT 30. System 10 further includes software components running on remote processors 16, 18 (which in the WQM example represent active test probes), including DCS components (not shown in FIG. 2) and Test Session Servers (TSS 20, 22), which in a preferred embodiment is a Java servlet. With reference to FIG. 3, a test session servlet 34 is a special purpose software application that resides in a web server 36 (such as running on test probes 16,18) that communicate with a client program 40 using the HTTP protocol, and which can run software programs such as, for example, tests 38, in sequence. For example, client 40 may submit a list of the test software programs along with the parameters required to run them. The test session servlet returns the test results to the client 40.

A database (not shown) resides at the active test controller 14 to store the test results received from the testing services. With a sufficient amount of test result data, the system 10 can present changes and/or patterns in the QOS of a service under test (SUT) and monitor the stability of a particular system. The tests themselves can call up such historical data from memory. For example, the system can compare characteristics (e.g., travel time of an SMS message) of historical test results with new test results to determine if follow up actions are necessary (e.g., repeated or additional tests, triggering of alarms) if some pre-set variation threshold is exceeded.

In an aspect that will be readily apparent to those of skill in the art, the present invention provides a computer program product encoded on one or more programmable storage devices. The computer program product is executable by the one or more processors described above to perform multi-location testing in the system. Each processor and the test controller are preferably general purpose computers in the form of conventional personal computers configured to operate as servers or as clients. The computers preferably have one or more of the following drives: a hard disk drive for reading from and writing to a hard disk, a magnetic disk drive for reading from or writing to a removable magnetic disk, and an optical disk drive for reading from or writing to a removable optical disk such as a CD ROM. The drives and their associated computer-readable media provide nonvolatile storage of computer readable instructions, data structures, program modules, test results and other data for the processors.

Multi-Location Testing Method

Figure 4:
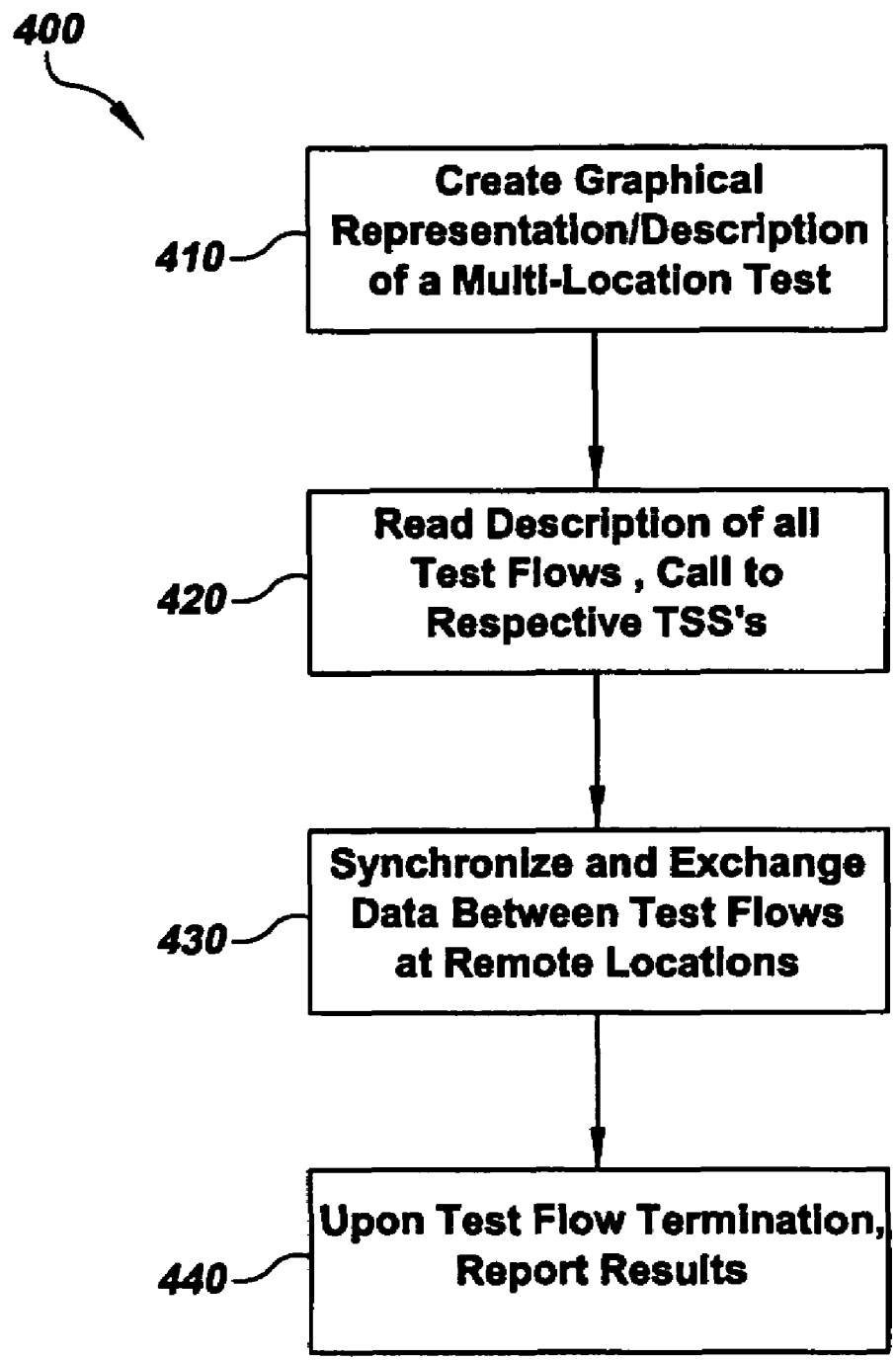
FIG. 4 is a flow diagram illustrating an embodiment of a method of performing multi-location testing in accordance with the present invention.

With reference to FIG. 4, one method 400 of using the test system 10 to conduct automated, multi-location testing can use a web browser to substantially simultaneously initiating at least a first flow A 24 and a second flow N 26. In steps that will be described in more detail below, a graphical description of the multi-location test is created (step 410), then the MLT reads the description of all test flows that are to run at different test locations, and makes a call to the TSSs at the respective locations (step 420). In step 430, synchronization of the flows for concurrent execution is achieved between and among the remote locations using open communication protocols. Note that system 10 is not necessarily configured for "master" and "slave" control, meaning that DCS 28, after substantially simultaneously initiating the flows, does not possess unidirectional control over the flows. This is an important distinction from conventional systems in which one single program controls the entire multi-location testing. In systems in accordance with the invention, two categories of test components exist, namely functional components that provide useful information to a user, and infrastructure components, which include the software components responsible for synchronization and data exchange. The independence of the distributed components permits more efficient use of resources by conveying to a resource manager messages that a flow's use of a resource is done, and the resource manager can then release the resource for use by other flows before the entire test is finished. Finally, in step 440, test results are reported upon the termination of the flows.

Graphical Representation of the Multi-Location Test

Figure 5:
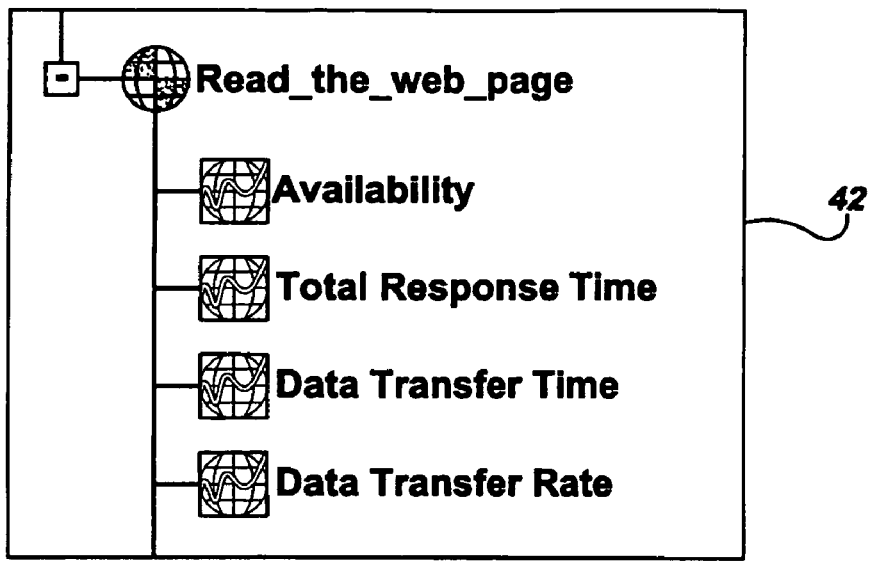
FIG. 5 is a graphical representation of a single software test as in the prior art.

In step 410, the MLT 30 and browser 12 operate to facilitate generation of a graphical representation of the multi-location test to be performed. Existing graphical test description tools such as the Agilent WQM provide a way to describe a single remote software artifact. In WQM terminology, this is referred to as a 'test' because this software is used for testing some aspect of a service under test (SUT). FIG. 5 illustrates a prior art graphical representation 42 of a single software test which reads a specified web page and produces useful information, called 'measurements'. Measurement test result values permit quantization of the performance of a web service under test, as would be experienced by a user of a web page of the web service attempting to 'surf' to the web page. For example, the test reports a 'Total Response Time' for downloading the web page.

Figure 6:
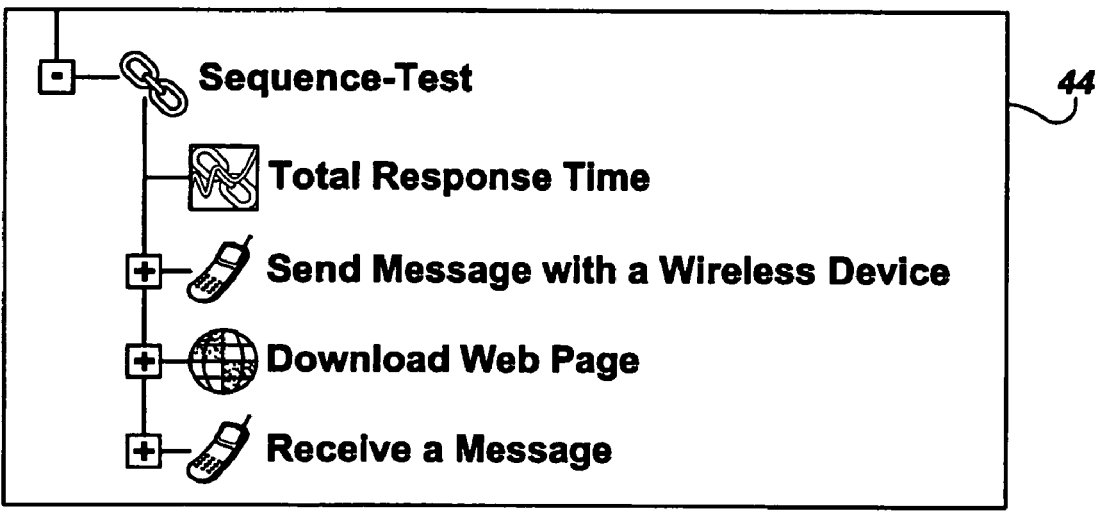
FIG. 6 is a graphical representation of a sequence of software tests as in the prior art.

The WQM also allows placing such 'tests' on remote computers processors (such as those of test probes 16, 18) under the control of other programs called 'Agents' that run tests similar to these on a regular interval to create 'performance charts' for each SUT. The WQM also provides another graphical tool to run a number of such tests in a sequence on any remote 'agent'. FIG. 6 illustrates a hierarchical graphical representation 44 of a sequence of tests to be executed in a strict sequential manner.

Figure 7:
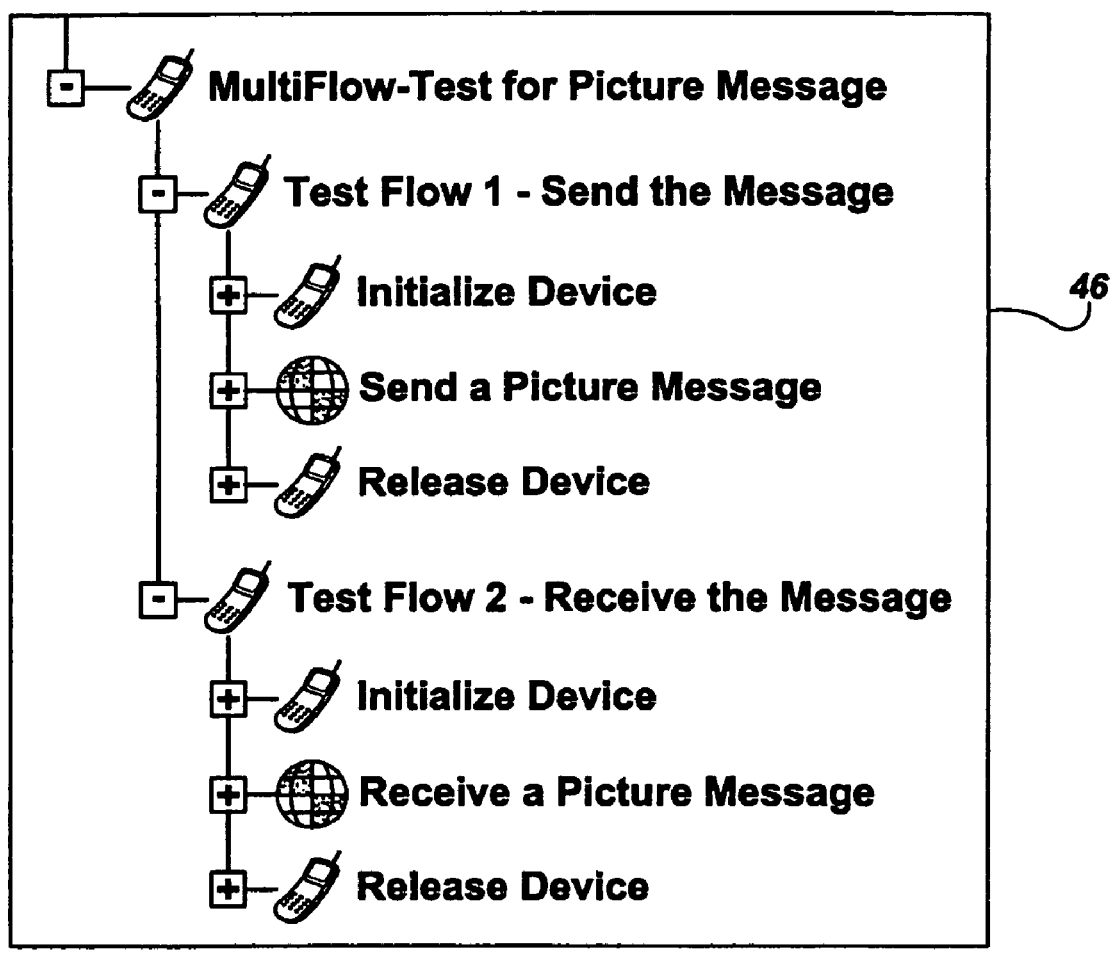
FIG. 7 is a graphical representation of a sequence of a multi-flow test in accordance with an embodiment of the present invention.

One of the aspects of the invention is a graphical representation of a concurrent, remote and synchronized multi-location test as multiple test flows, under the control of the MLT 30. FIG. 7 illustrates a graphical representation 46 of a multi-location test that simulates two remote wireless device (e.g., cell phone) users. Test flow 1 represents sending of a picture message from a wireless device (phone). Test flow 2 represents another wireless device receiving the message. Graphical representation 46 was created using existing tools in the QOS manager. Note that the flows are now shown as parts of a single 'test' which the QOS manager can deploy on an agent at a remote location. However, each flow is a self contained unit under the multi-flow test.

Execution of the Multi-Location Test

Figure 8:
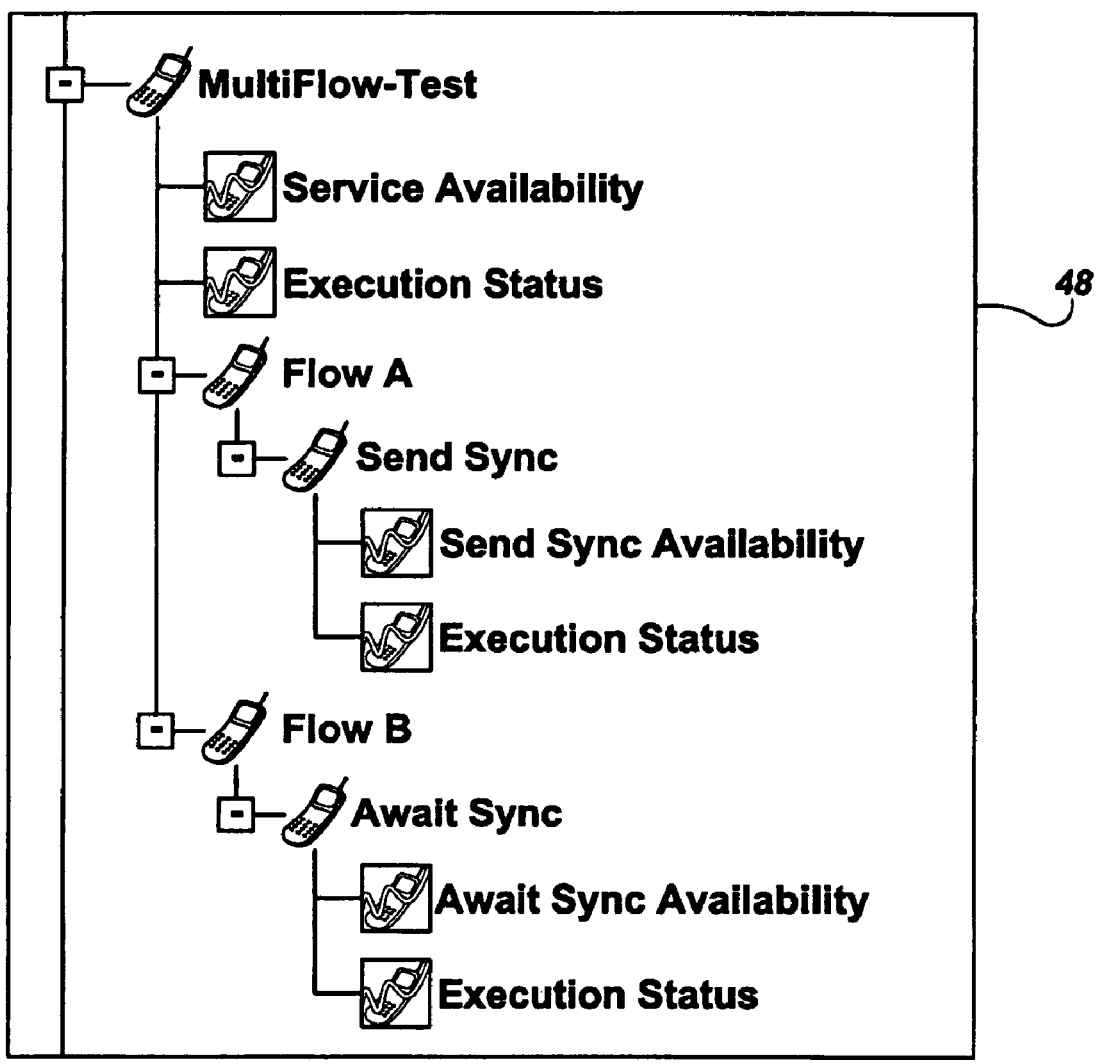
FIG. 8 is another graphical representation of a two-sided multi-flow test in accordance with an embodiment of the present invention.

With reference again to the method illustrated in FIG. 4 and the architecture depicted in FIG. 2, in step 420 the MLT 30 then converts the graphical representation of the multi-location test into a textual representation for transmission to the remote agent. The Agilent WQM provides one such textual representation in a language called 'SmartFrog', however, the invention is by no means intended to be limited to any particular format. Any public domain hierarchical data representation format, like XML may also be used to represent the test flows and transmitted to the multi-location test. An example of a graphical representation 48 of a two-sided multi-flow test is provided in FIG. 8, and a corresponding textual representation is included in Example 1.

```
Multi_Flow_Test extends ROOT:BaseComponents:Test {
    sfClass "com.firehunter.agent.multiflowtest.MultiFlowTest";
    Target extends LAZY {
    }
    Measurements extends ROOT:BaseComponents:TestGroup_wireless {
        ServiceAvailability extends ROOT:Tests:WQM-TestComponents:Flow-
        Management:W_AwaitSync_6-0:Multi_Flow_Test:BaseMeas {
        }
        ExecutionStatus extends ROOT:Tests:WQM-TestComponents:Flow-
        Management:W_AwaitSync_6-0:Multi_Flow_Test:BaseMeas {
        }
    }
    TemplateLabel "Multi_Flow_Test";
    W_MultiFlowFlow_7-0.20351034774225 extends ROOT:BaseComponents:Test {
        sfClass "com.firehunter.agent.wsqm.NullTest";
        Target extends LAZY {
            DeviceProperties extends {
            }
            IMProperties extends {
            }
            MeasAttrs ["fhSeqName"];
        }
        Measurements extends ROOT:BaseComponents:TestComponent_wireless {
            GuiLabel "Flow A";
        }
        TemplateLabel "Flow A";
        W_SendSync_6-0.20351034774226 extends ROOT:BaseComponents:Test {
            sfClass "com.firehunter.agent.datastore.SendSync";
            Target extends LAZY {
            }
            Measurements extends
            ROOT:BaseComponents:TestComponent_wireless {
                SendSyncAvailability extends ROOT:Tests:WQM-
                TestComponents:Flow-Management:W_AwaitSync_6-
                0:Multi_Flow_Test:W_MultiFlowFlow_7-
                0.20351034774225:W_SendSync_6-
                0.20351034774226:BaseMeas {
                }
                ExecutionStatus extends ROOT:Tests:WQM-
                TestComponents:Flow-Management:W_AwaitSync_6-
                0:Multi_Flow_Test:W_MultiFlowFlow_7-
                0.20351034774225:W_SendSync_6-
                0.20351034774226:BaseMeas {
                }
            }
    }
    W_MultiFlowFlow_7-0.20351034774237 extends ROOT:BaseComponents:Test {
        sfClass "com.firehunter.agent.wsqm.NullTest";
            DeviceProperties extends {
            }
            IMProperties extends {
            }
            MeasAttrs ["fhSeqName"];
        }
        Measurements extends ROOT:BaseComponents:TestComponent_wireless {
            GuiLabel "Flow B";
        }
        TemplateLabel "Flow B";
        W_AwaitSync_6-0.20351034774251 extends ROOT:BaseComponents:Test {
            sfClass "com.firehunter.agent.datastore.AwaitSync";
            Target extends LAZY {
```

```
        }
        Measurements extends
        ROOT:BaseComponents:TestComponent_wireless {
            AwaitSyncAvailability extends ROOT:Tests:WQM-
            TestComponents:Flow-Management:W_AwaitSync_6-
            0:Multi_Flow_Test:W_MultiFlowFlow_7-
            0.20351034774237:W_AwaitSync_6-
            0.20351034774251:BaseMeas {
            }
            ExecutionStatus extends ROOT:Tests:WQM-
            TestComponents:Flow-Management:W_AwaitSync_6-
            0:Multi_Flow_Test:W_MultiFlowFlow_7-
            0.20351034774237:W_AwaitSync_6-
            0.20351034774251:BaseMeas {
            }
        }
        TemplateLabel "AwaitSync";
      }
    }
}
```

EXAMPLE 1

The MLT reads the text representation and identifies the number of flows (for example, flows 24, 26) in the test to be performed, any devices (16,18 for example) the tests need to be run on, and the remote locations of the agents which control the devices. The MLT contacts the TSS 20,22 running at each remote location associated with the flows and supplies the description of the sequence of tests to be run. Again, the TSS use standard Hypertext Transfer Protocol (HTTP), open network protocol used for the World Wide Web. The MLT, after identifying the number of flows in the test, contacts the TSS at the location of each flow substantially simultaneously and submits a request to run the sequence tests concurrently under each flow.

Synchronization and Dynamic Data Exchange Between Test Flows

In step 430 of the method illustrated in FIG. 4, the wireless test system 10 utilizes the DCS 28 to synchronize test execution and to control data exchange between or among remote tests. In the WQM implementation, DCS 28 uses the HTTP protocol and requires that data is specified using XML, a text markup language like the HTML (Hyper Text Markup Language) use to construct web pages. DCS also requires that each data unit is identified using a unique identifier key so that data elements with same name or older data elements from an earlier run of the same test are not confused with new data elements.

Figure 9:
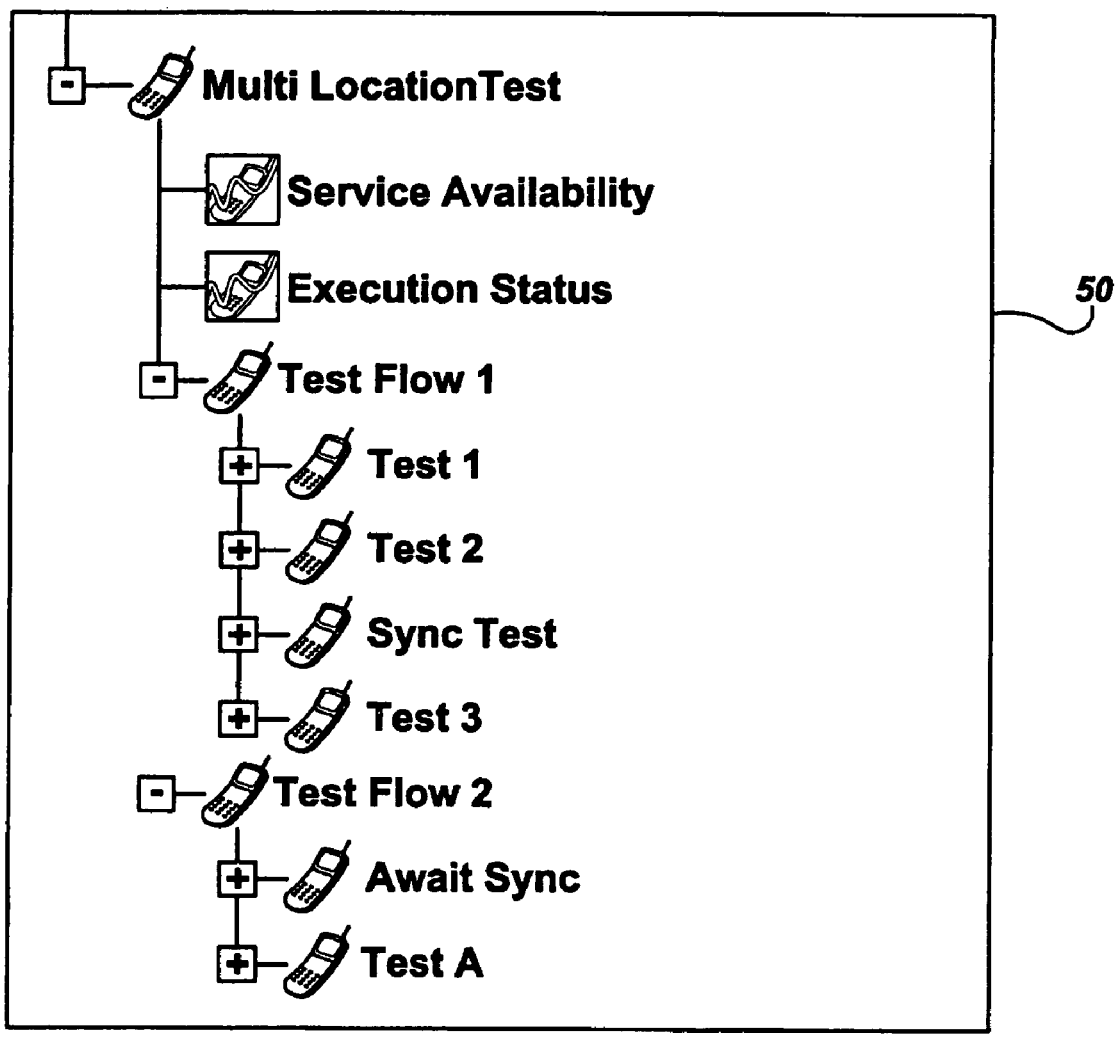
FIG. 9 is a graphical representation of a multi-flow test in accordance with an embodiment of the present invention illustrating synchronization between flow.

Explicit time synchronization is achieved through use of special tests, called the 'sync send' and 'sync receive' tests, which employ special data strings permitting or requiring a receiver test to wait for a sender test to reach a certain point in test execution before proceeding. FIG. 9 illustrates a graphical representation 50 including a 'send sync' test and an 'await sync' test that achieve time synchronization between test flows. Test Flow 1 executes Test-1 and Test-2 before sending a 'sync' data element to the DCS 28. Test Flow-2 executes the 'Await Sync' test, which periodically reads data from the DCS to determine if the 'sync' data element has arrived from Test Flow-1. The net effect is that Test-1 and Test-2 from Test Flow-1 are guaranteed to run before Test A from Test flow B is run.

In accordance with an alternative embodiment of the invention, the XML data format provided by DCS 28 is extended to specify a 'control' message. Addition of the control message mode beyond the pre-defined data only format permits the Test Flows to implicitly exchange timing and other information without needing to introduce special test components. The 'control messaging' capability allows the Test Flows to broadcast emergency messages to other test flows to terminate test execution and/or return metadata of test execution (e.g., number of tests run, start and end time for each test in each flow and result of running each test, etc.) to the entity that starts the MLT.

Test execution information and test data are exchanged over the Internet via normal HTTP requests so the platform of a client or server can be unknown to the active test controller 14. The architecture is independent of the tests being run against SUT as it essentially allows execution of any tests for any product.

Exemplary Synchronization Architecture Embodiment

Figure 10:
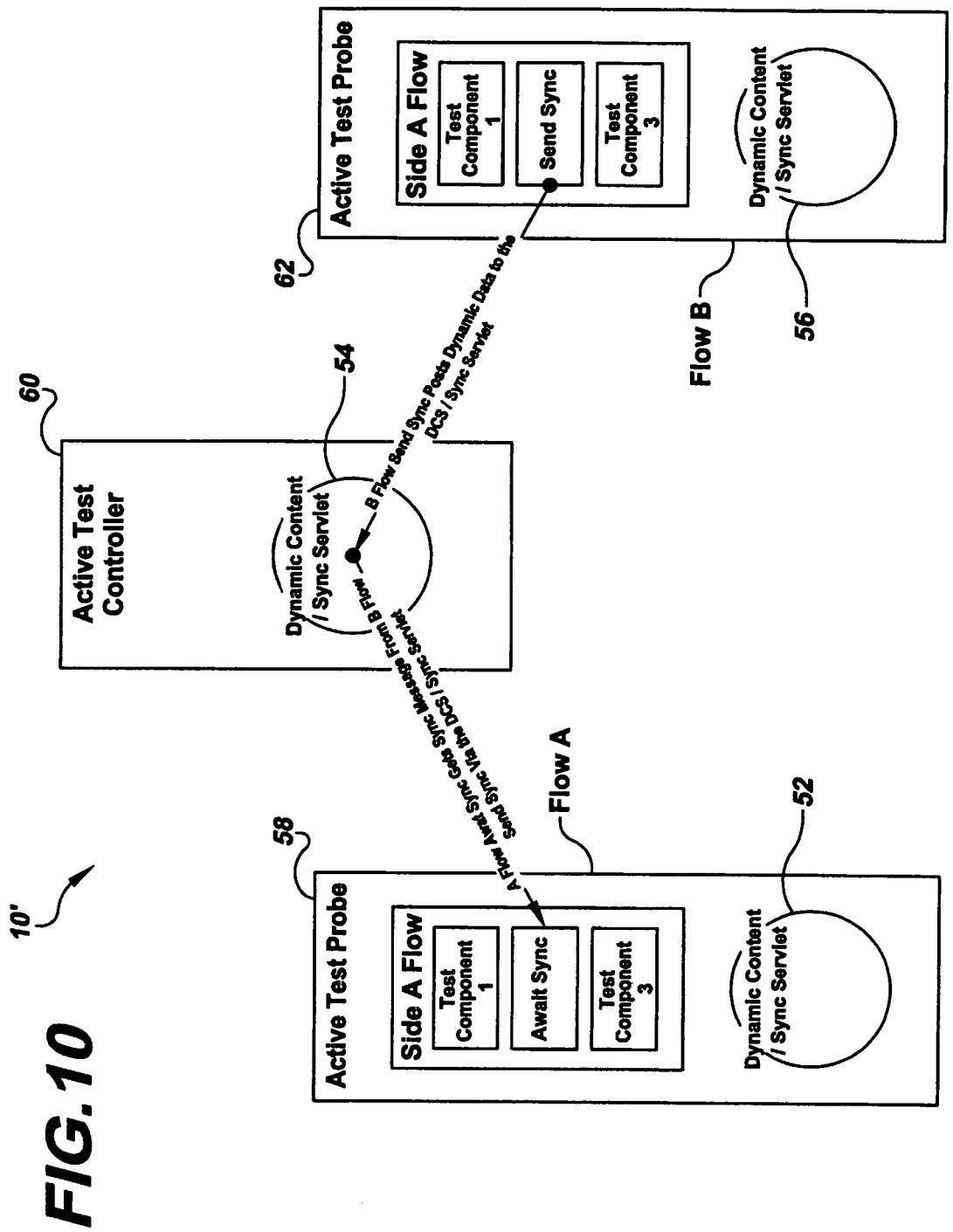
FIG. 10 is a block diagram illustrating a portion of a system performing synchronization in accordance with an embodiment of the present invention.

FIG. 10 shows one portion 10' of an implementation of the present invention, where flows A and B in the multi-sided test system are synchronized using sync servlets 52, 54 and 56 located, respectively, in Active Test Probe 58 corresponding to Flow A, Active Test Controller 60, and Active Test Probe 62 corresponding to Flow B.

In a preferred embodiment of the present invention, each of Active Test Probe 58, Active Test Controller 60 and Active Test Probe 62 is an individual agent in system 10', although other configurations are possible and fall within the scope of the present invention. Note that sync servlets 52 and 56 in FIG. 10 are not employed in the example given below, but may be employed in other configurations or flows not disclosed explicitly herein. Depending on the system configuration at hand, the appropriate destination for a particular signal or message, such as an "Await Synch" or "Send Synch" signal, may or may not need to be specified, although in a preferred embodiment of the present invention such a destination must be specified as indicated in the schemata set forth below. For example, the "Send Sync" signal originating in Flow B of FIG. 10 may be specified as having an ultimate destination in Flow B, and the "Await Synch" signal originating in Flow A may be specified as having an ultimate destination in sync servlet 54.

In FIG. 10, Flow A is represented by Test Component 1, Test Component 2 ("Await Sync") and Test Component 3 in Active Test Probe 58. Flow B is represented by Test Component 1, Test Component 2 ("Send Sync") and Test Component 3 in Active Test Probe 62. First and second flows A and B are initiated substantially simultaneously. Execution of Flow A pauses upon Flow A having proceeded to the second "Await Sync" test component or event. Execution of the "Await Sync" test component in Flow A causes a message or instruction to be sent or posted to sync servlet 54 stating that Flow A awaits the receipt of a "Send Sync" signal or message from Flow B. The amount of time the "Await Sync" test component in Flow A will await receipt of a "Send Sync" signal may be a configurable timeout. When Flow B has proceeded to the "Send Sync" test component, a "Send Sync" signal is posted to sync servlet 54. The next time Flow A requests permission to resume execution (i.e., "Has a "Send Sync" signal been received from Flow B?"), the "Send Sync" signal has already been received by sync servlet 54, and Flow A receives permission to resume execution by running the next step (i.e., execution of Test Component 3 now occurs).

By way of illustrative example only and with no intention of limiting the scope of the present invention, FlowA:test1 in FIG. 10 may be a test that navigates to a webpage requesting authentication information for logging into a 802.11 wifi network, and having the bill and login information sent to a cell phone account. FlowB:test1 then receives the confirmation message on the cell phone with the username and password. FlowA:test3 next uses the username and password to login to the wifi network. FlowA:test3 cannot login before FlowB:test1 has received proper authentication information. The FlowA:await sync causes execution to pause until FlowB:send sync has been sent, at which point execution continues. As will now be appreciated, send sync and await sync functionalities may be implemented in multiple flows to allow more complicated multi-sided and multi-flow networks or systems to be tested.

Note that the embodiment of the present invention shown in FIG. 10 is specifically adapted for use in a wireless service test setting such as a wifi login application, although numerous other applications are contemplated and nevertheless fall within the scope of the present invention.

Continuing to refer to FIG. 10, each of sync servlets 52, 54 and 56 may be a multi-threaded program running on any of agents 58, 60 and 62 in system 10'. Each agent should possess sync servlet functionality, even though such functionality may not be used in respect of a given servlet according to a particular system configuration. For example, sync servlet functionality may be imparted to agents 60 and 62 and not 58, while still permitting the testing procedures described above to occur. In an optimal system configuration, however, each agent possesses dynamic content servlet functionality.

Tests may be invoked by a caller located remotely from any of the agents of system 10' if the caller is connected to a network to which such agents are connected, or to which one of such agents is connected. Such a network may be any network, such as the internet. In one embodiment of the present invention, agents 58, 60 and 62 may be computers and/or server.

According to one embodiment of the present invention, dynamic content servlet functionality is added to a sync servlet. While dynamic content servlet functionality differs from that of a sync servlet, dynamic content servlet functionality may generally be piggybacked onto a sync servlet to avoid running multiple servlets, as shown in FIG. 10.

In one embodiment of the present invention, test descriptions or requests to synchronize may be incorporated into a predefined XML schema (or even plain text) in either an HTTP post or an HTTPS post. HTTP (Hyper Text Transfer Protocol) is a generic message transport standard, or a standardized way of communicating over the internet. An HTTP Get is what a web browser does; it only receives data. But an HTTP Post allows sending of a body of data and also receipt of an answer.

The body of data sent by an HTTP Post is organized via the XML schema. XML (Extensible Markup Language) is a standardized way of encoding data, or in other words, genericizing the data, enabling definition, transmission, validation, and interpretation of the data between applications.

Interface design details implementing one embodiment of the invention illustrated in FIG. 10 are set forth below in Example 2, where text representations of sync servlet input schema are shown. While the sync servlet implementation set forth hereinbelow is written in Java, such functionality may be implemented in any suitable programming language, or run under any web server that supports servlets. Other standards-based servers and protocols may also be used to implement sync servlets. Sync servlets may accept HTTP posts with a defined XML encoded body only to enter or get data. Using such a functionality, a sync object contained by each test running in a given flow may then post data to or get data from the sync servlet. The sync servlet may be posted to using HTTP or HTTPS (secure socket layer) to ensure security.

EXAMPLE 2

WQM Sync Servlet Interface Design (A) Input and Output Interface to the Sync/Dynamic Content Servlet
(1) Brief Description The Dynamic Data Servlet will run on any QoSM WQM agent. It provides a data store for dynamic data of running tests and processes requests to "add", "remove" or "get" dynamic data for a specific unique id, or to "delete" all data for that unique id.

(2) Dynamic Data Design Related Assumptions
  The following attributes are found in the Wireless section of fh.conf. They may be overwritten by hidden (fh prefix) attributes in the Wireless Chain Test itself.
    DcsLocation—(String) default is the same as the Host (ATC) attribute.
    DcsPort—(Integer) default is 16716
    DcsTimeout—(Integer) default 0 (look once, no waiting)
    DcsLookup—(Boolean) default true (check DCS if not in local store)
  The following must be available in the flow level data stores:
    DcsLocation
    DcsPort
    DcsTimeout
    DcsLookup
    ChainId—(String) a unique id for this test execution
    FlowId—(String) the name of the current flow
  A DcsControl test component will be available to change the values of the Dcs* attributes described above
  The DcsPurgeTime entry in the Wireless section of fh.conf will define the age at which to purge old data in DCS (in hours)
(3) Technical Requirements
  Ability to run a servlet on the QOSM agent.
  Defined XML interface for the HTTP Request and Response.

(4) Definition or Design Description
The interface to the servlet will be an HTTP Post.
Example url! http://<DcsLocation>:<DcsPort>/DynamicContentServlet
The body of the post will be XML. The XML interface is defined herein.
The behavior of the DCS mimics a Hashtable:
It is not legal to store a null key or value, a NullPointerException will result.
A "put" returns the value previously stored (or null if no value was found)
A "get" returns the value stored (or null if no value was found)
A "remove" returns the value previously stored (or null if no value was found)
A "delete" removes all data for a unique id, and returns all values previously stored.
The DCS has some special behavior when storing "Sync" datum is stored.
The name of the Sync datum is "dcs_sync<fromFlow>:<toFlow>"
The value stored for a Sync type datum is an integer.
If a value already exists for this datum, it is incremented by another "put"
The value for this datum is decremented by a "get", if the resulting value is 0, the datum is removed.
Purging of old data not properly removed at the end of test execution is carried out.
The DcsPurgeTime value found in fh.conf is used as the age to delete old test data, with a default of 24 hours.
The frequency of checking for old data to purge is based on the aging value (1/10 the value).
(5) SITE Dependencies
TDL code that can call the DynamicContentServlet, wait for the response and accept the output.
(6) Generating and parsing the XML in Tcl and Java
Description:
Learning curve on parsing XML
Resolution/Progress:
Learning the Document Object Model in jdk1.4.1 to parse XML
Utilizing procedures already present in Tdl for handling XML
(7) Building the outgoing XML in java
Description:
Learning curve on parsing XML
Resolution/Progress:
Learning the Document Object Model in jdk1.4.1 to parse XML Assumptions
The XML sent must be in the correct form or will not be validated.

Technical Requirements
The interface is an HTTP Post that contains an XML body as the input to the servlet.
The output is the Post response, also in XML format.

(B) Definition or Design Description
(1) Input "put" Request Syntax

```
<DcsRequest>
    <UniqueId> chainId </UniqueId>
    <Action> put </Action>
    <DynamicData> (can contain multiple Datum tags)
        <Datum>
            <Name> datumName </Name>
            <Type> datumType </Type>
            <Value> datumValue </Value>
        </Datum>
    </DynamicData>   >
</DcsRequest>
```

(2) Input "put" Sync Request Syntax

```
<DcsRequest>
    <UniqueId> chainId </UniqueId>
    <Action> put </Action>
    <DynamicData>
        <Datum>
            <Name> dcs_sync:<fromFlow>:<toFlow> </Name>
            <Type> Integer </Type>
            <Value> 1 </Value>
        </Datum>
    </DynamicData>   >
</DcsRequest>
```

(3) Input "get" Request Syntax

```
<DcsRequest>
    <UniqueId> chainId </UniqueId>
    <Action> get </Action>
    <Timeout> 60 </Timeout>
    <DynamicData> (can contain multiple Datum tags)
        <Datum>
            <Name> datumName </Name>
        </Datum>
    </DynamicData>   >
</DcsRequest>
```

(4) Input "get" Sync Request Syntax

```
<DcsRequest>
    <UniqueId> chainId <UniqueId>
    <Action> get </Action>
    <DynamicData>
        <Datum>
            <Name> dcs_sync:<fromFlow>:<toFlow> </Name>
        </Datum>
    </DynamicData>   >
</DcsRequest>
```

(5) Input "remove" Request Syntax

```
<DcsRequest>
    <UniqueId> chainId </UniqueId>
    <Action> remove </Action>
    <Timeout> 60 </Timeout>
    <DynamicData> (can contain multiple Datum tags)
        <Datum>
            <Name> datumName </Name>
        </Datum>
    </DynamicData>   >
</DcsRequest>
```

(6) Input "delete" Request Syntax—deletes all data for a particular chain id

```
<DcsRequest>
    <UniqueId> chainId </UniqueId>
    <Action> delete </Action>
</DcsRequest>
```

(7) Output Response Syntax if no Exception

```
<DcsResponse>
    <UniqueId> chainId </UniqueId>
    <Action> (action from request) </Action>
    <DynamicData> (can contain multiple Datum tags)
        <Datum>
            <Name> datumName </Name>
            <Type> datumType </Type>
            <Value> datumValue </Value>
        </Datum>
    </DynamicData>  >
</DcsResponse>
```

(8) Output Response Syntax if Exception

```
<DcsResponse>
    <UniqueId> chainId </UniqueId>
    <Action> (action from request) </Action>
    <Exception>
        <Type> exception type </Type>
        <Message> exception message </Message>
        <StackTrace> exception stack trace </StackTrace>
    </Exception>
</DcsResponse>
```

(9) SQM (Firehunter) Dependencies
   None
(10) SITE Dependencies
   Ability to do an HTTP Post to the servlet with the correct XML body.
   Ability to receive the post response XML.
(11) JUnit Testing Strategy
   Test by running unit tests on the actual interface.

The sync servlet schemata set forth above and illustrated in the Figures are only examples. The present invention is not limited to such schemata; other schemata may be used and still fall within the scope of the present invention; provided, however, that appropriate changes are made to the sync servlets and their corresponding test components. Moreover, schemata of the present invention are not limited to XML; other markup ("tag") languages, or even plain text, and their corresponding test components, may also be employed.

Figure 11:
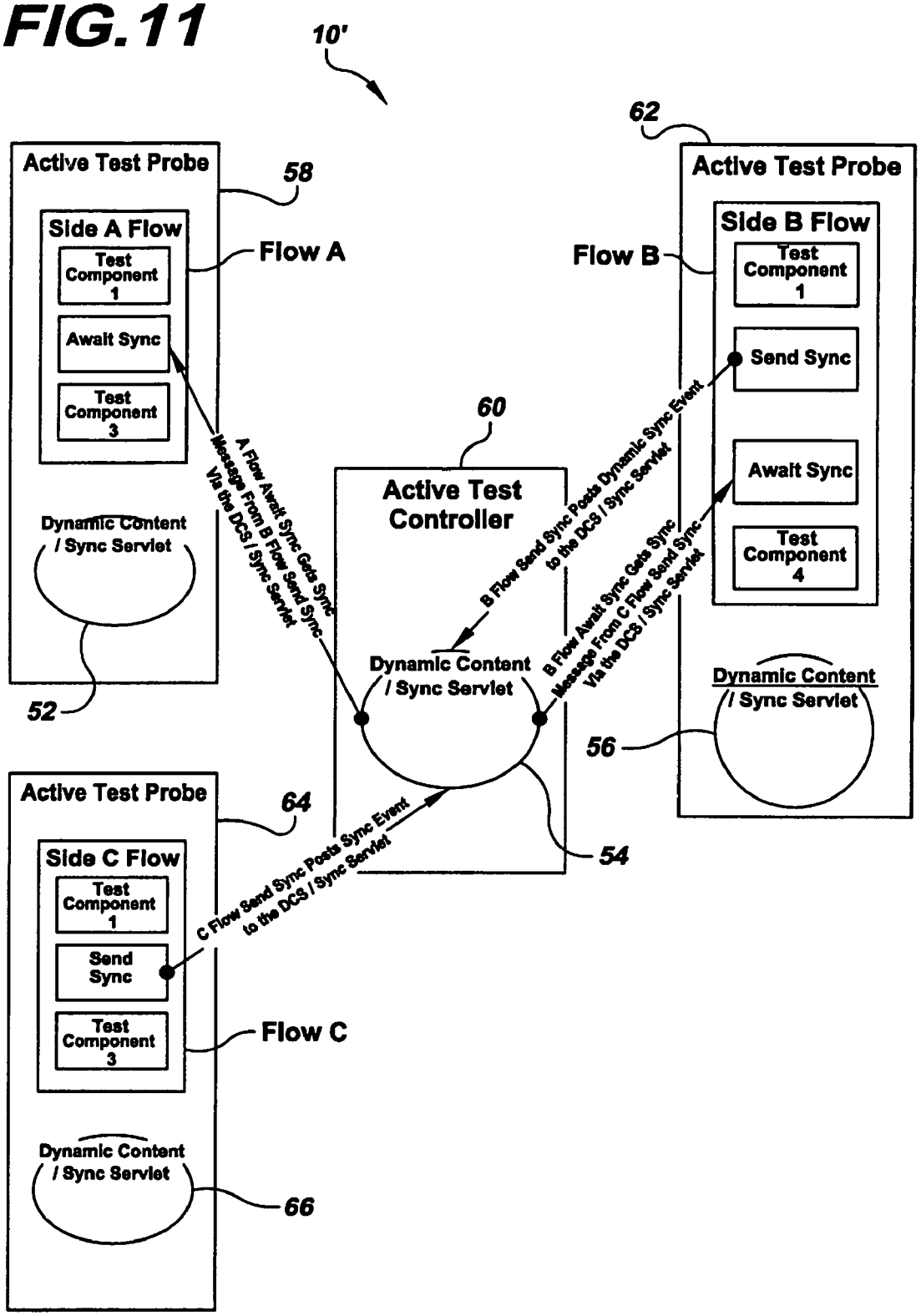
FIG. 11 is another block diagram illustrating a portion of a system performing synchronization in accordance with an embodiment of the present invention.

FIG. 11 shows another embodiment of the present invention, where three Flows A, B and C are initiated concurrently. Each flow runs its first test component. When Flow A runs the "Await Sync" test component, Flow A is caused to pause execution until a "Send Sync" signal or message is received via sync servlet 54 from Flow B. The amount of time the "Await Sync" test component in Flow A will await receipt of a "Send Sync" signal may be a configurable timeout. When Flow B has proceeded to the "Send Sync" test component, a "Send Sync" signal is posted to sync servlet 54. The next time Flow A requests permission to resume execution (i.e., "Has a "Send Sync" signal been received from Flow B?"), the "Send Sync" signal has already been received by sync servlet 54, and Flow A receives permission to resume execution by running the next step (i.e., execution of Test Component 3 now occurs). When Flow C reaches its "Send Sync" test component, a "Send Sync" signal or message is sent to Flow B via sync servlet 54. Once the "Send Sync" signal or message originating from Flow C is received by the "Await Sync" test component in Flow B, Flow B resumes execution to test component 4.

Figure 12:
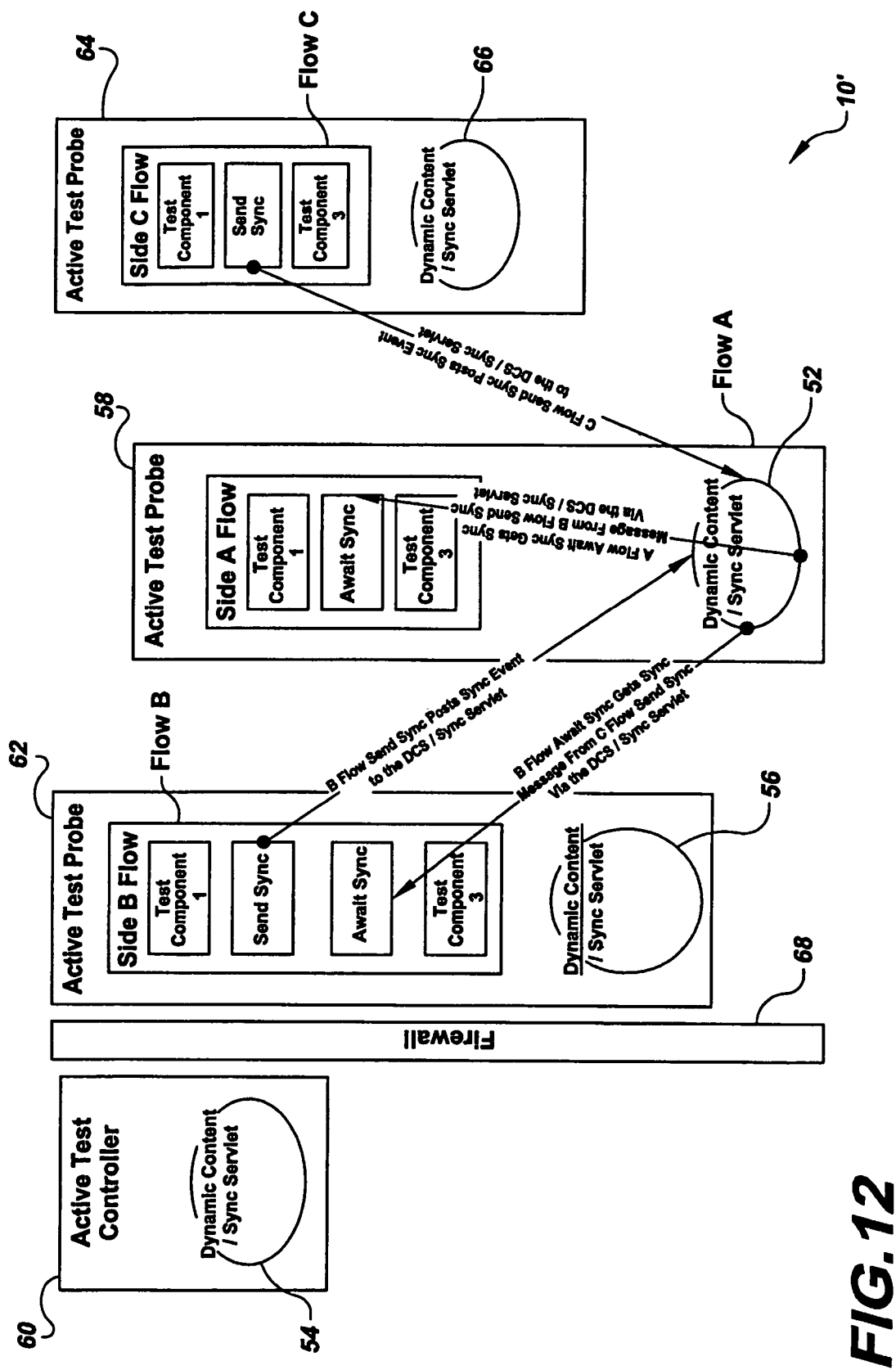
FIG. 12 is yet another block diagram illustrating a portion of a system performing synchronization in accordance with an embodiment of the present invention.

FIG. 12 shows another embodiment of the present invention, where firewall 68 is disposed between Active Test controller 60 and Flows A, B and C. Flows A, B and C are initiated concurrently. Each flow runs its first test component. Because firewall 68 is disposed between Active Test Controller 60 and Active Test Probes 58, 62 and 64, however, sync servlet 54 may not be used. Nevertheless, in the embodiment of the present invention shown in FIG. 12, any sync servlet may be accessed by any of Active Test Probes 58, 62 or 64, thereby rendering system 10' operative. In FIG. 12, sync servlet 52 of Active Test Probe 58 is employed to fulfill such a function.

When Flow A has proceeded to the "Await Sync" test component, execution of Flow A is paused while awaiting receipt of a "Send Sync" signal or message from Flow B. When Flow B reaches second test component "Send Sync" sometime later, a "Send Sync" signal or message is posted to sync servlet 52 from Flow B. The "Await Sync" test component in Flow A receives the "Send Sync" signal from Flow B via sync servlet 52, which triggers the resumption of Flow A. Flow B continues execution to the "Await Sync" test, and is paused awaiting receipt of a "Send Sync" signal or message from Flow C. When Flow C reaches its "Send Sync" test component, a "Send Sync" signal or message is sent to Flow B via sync servlet 52. Once the "Send Sync" signal or message originating from Flow C is received by the "Await Sync" test component in Flow B, Flow B resumes execution to test component 4.

Various protocols are described herein, such as HTTP and HTTPS. The present invention in not limited to such protocols, however, and explicitly contemplates the use of other protocols such as FTP ("File Transfer Protocol"), SCP ("Secure Copy Protocol") and SFTP ("Secure File Transfer Protocol"). Similarly, various networks are described herein, such as a LAN, a wireless network, a wire line network, and the internet. The present invention is not limited to such networks; other networks may be employed and fall within the scope of the present invention.

The present invention may be employed successfully over a wide range of wireless network types and standards, including, but not limited to, wifi 802.11a, wifi 802.11b, wifi 802.11 g, wimax, GSM/GPRS and CDMA, as well as other standards yet to be devised or implemented. Moreover, the present invention is not limited in scope to wireless test applications, and includes within its scope wireline test applications such as Ethernet/LAN and dial-up networks.

Figure 13:
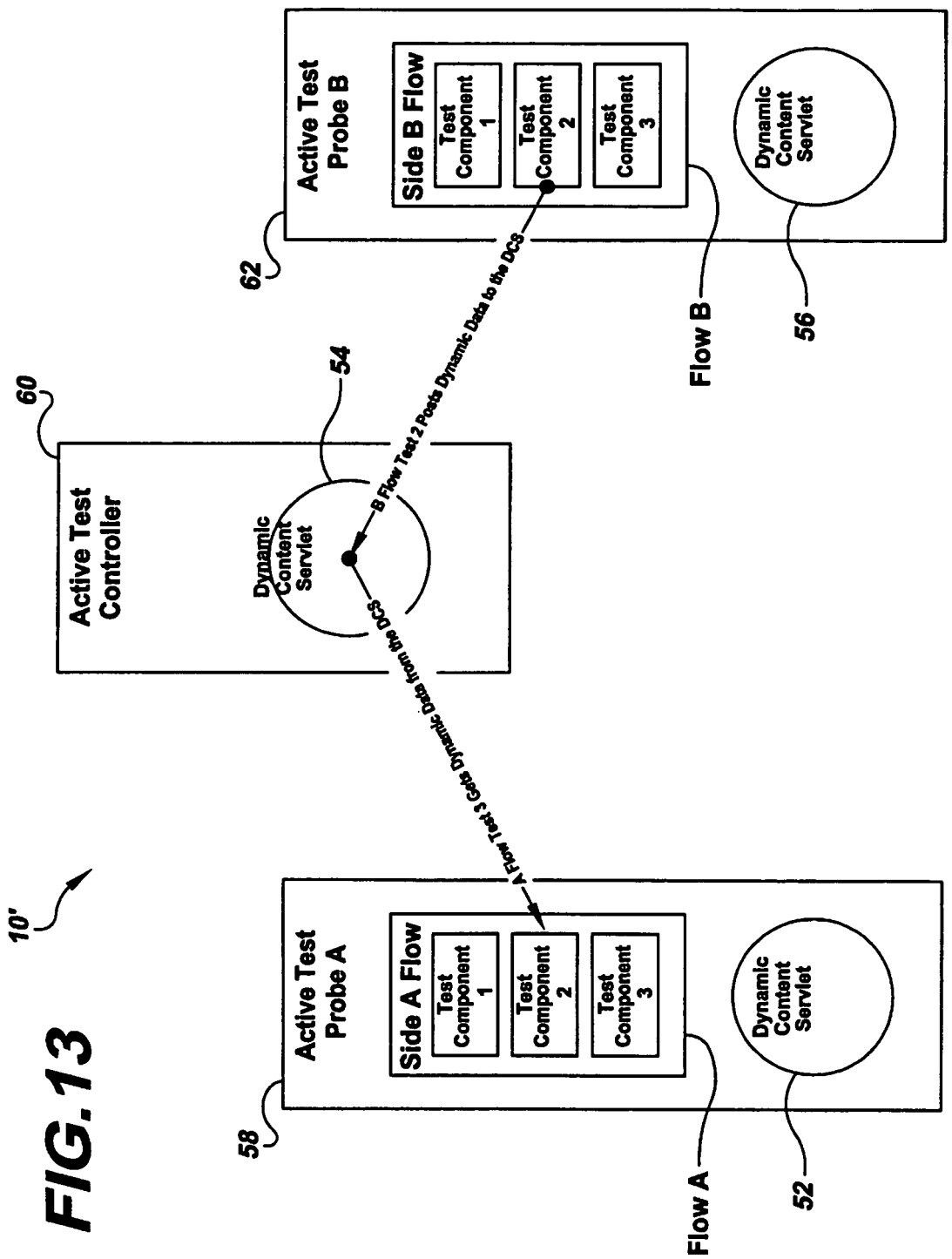
FIG. 13 is a block diagram illustrating a portion of a system performing dynamic data exchange in accordance with an embodiment of the present invention.

In a preferred embodiment, the synchronization methods of the present invention are carried out using an Agilent WQM Agent, many aspects of which are described at: http://we.home.agilent.com/cgi-bin/bvpub/agilent/Product/cp_Product.jsp?OID=536882909&NAV_ID=-536885380.536882909.00&LANGUAGE_CODE=eng&COUNTRY_CODE=ZZ&CT=PRODUCT&JPID=/comms/firehunter Exemplary Dynamic Data Exchange Architecture Embodiment FIG. 13 shows a portion 10" of one embodiment of the present invention, where first and second flows A and B in a multi-sided test system share and/or transfer dynamically generated data by means of open communication standards using sync servlets 52, 54 and 56 located, respectively, in Active Test Probe 58 corresponding to Flow A, Active Test Controller 60, and Active Test Probe 62 corresponding to Flow B.

In a preferred embodiment of the present invention, each of Active Test Probe 58, Active Test Controller 60 and Active Test Probe 62 is an individual agent in system 10", although other configurations are possible and fall within the scope of the present invention. Note that dynamic content servlets 52 and 56 in FIG. 13 are not employed in the example given below, but may be employed in other configurations or flows not disclosed explicitly herein.

In FIG. 13, Flow A is represented by Test Component 1, Test Component 2 and Test Component 3 in Active Test Probe 58. Flow B is represented by Test Component 1, Test Component 2 and Test Component 3 in Active Test Probe 62. In a preferred embodiment of the present invention, Tests Components within any given Flow are capable off sharing dynamic data between or among one another.

Continuing to refer to FIG. 13, Flows A and B are initiated substantially simultaneously. Execution of Test Component 2 in Flow A causes Test component 2 in Flow B to generate dynamic data that are required for Test Component 3 in Flow A to be successfully executed. Once generated in Test component 2 of Flow B, such dynamic data are posted from Flow B to dynamic data content servlet 54. When Flow A has proceeded to Test Component 3, the dynamic data content residing on sync servlet 54 is retrieved by Test Component 3. Flows A and B may now proceed to complete execution, the necessary dynamic data content having been shared or transferred between or among Flows A and B.

By way of illustrative example only and with no intention of limiting the scope of the present invention, FlowA:test2 in FIG. 13 may be a test that navigates to a webpage requesting authentication information for logging into a 802.11 wifi network, and having the bill and login information sent to a cell phone account. FlowB:test2 then receives the confirmation message on the cell phone with the user name and password. FlowB:test2 then posts the username and password to dynamic content servlet 54. FlowA:test3 then gets the user name and password from dynamic content servlet 54 and uses the user name and password to login to the wifi network.

Note that the embodiment of the present invention shown in FIG. 13 is specifically adapted for use in a wireless service test setting such as a wifi login application, although numerous other applications are contemplated and nevertheless fall within the scope of the present invention.

Continuing to refer to FIG. 13, each of dynamic data content servlets 52, 54 and 56 may be a multi-threaded program running on any of agents 58, 60 and 62 in system 10". Each agent may run a dynamic data content servlet capable of threading multiple test sessions in parallel; not all agents need have a dynamic data content functionality. For example, dynamic data content servlet functionality may be imparted to agents 60 and 62 and not 58, while still permitting at least some of the dynamic data sharing procedures described above to occur. In an optimal system configuration, however, each agent possesses dynamic content servlet functionality.

Dynamic data sharing may be invoked by a caller located remotely from any of the agents of system 10" if the caller is connected to a network to which such agents are connected, or to which one of such agents is connected. Such a network may be any network, such as the internet. In one embodiment of the present invention, agents 58, 60 and 62 may be computers and/or server.

According to one embodiment of the present invention, sync servlet functionality may be added to a dynamic content servlet. While sync servlet functionality differs from that of a dynamic content, sync servlet functionality may generally be piggybacked onto a dynamic content servlet to avoid running multiple servlets, as shown in FIG. 13.

In one embodiment of the present invention, requests to share data dynamically or other related instructions may be incorporated into a predefined XML schema in either an HTTP post or an HTTPS post. HTTP (Hyper Text Transfer Protocol) is a generic message transport standard, or a standardized way of communicating over the internet. An HTTP Get is what a web browser does; it only receives data. But an HTTP Post allows sending of a body of data and also receipt of an answer.

The body of data sent by the HTTP Post is organized via XML schema. XML (Extensible Markup Language) is a standardized way of encoding data, or in other words, genericizing the data, enabling definition, transmission, validation, and interpretation of the data between applications.

Interface design details implementing the embodiment of the invention illustrated in FIG. 13 are set forth above in Example 2, where text representations of dynamic data content servlet input schema are shown. While the dynamic data content servlet implementation set forth hereinbelow is written in Java, such functionality may be implemented in any suitable programming language, or run under any web server. Other standards-based servers and protocols may also be used to implement dynamic data content servlets. Dynamic data content servlets may accept HTTP posts with a defined XML encoded body to enter, get, remove, or replace data. Using such a functionality, a dynamic data content object contained by each test running in a given flow may then post data to, get data from, modify data, or remove data from the dynamic data content servlet. The dynamic data content servlet may be posted to using HTTP or HTTPS (secure socket layer) to ensure security.

Figure 14:
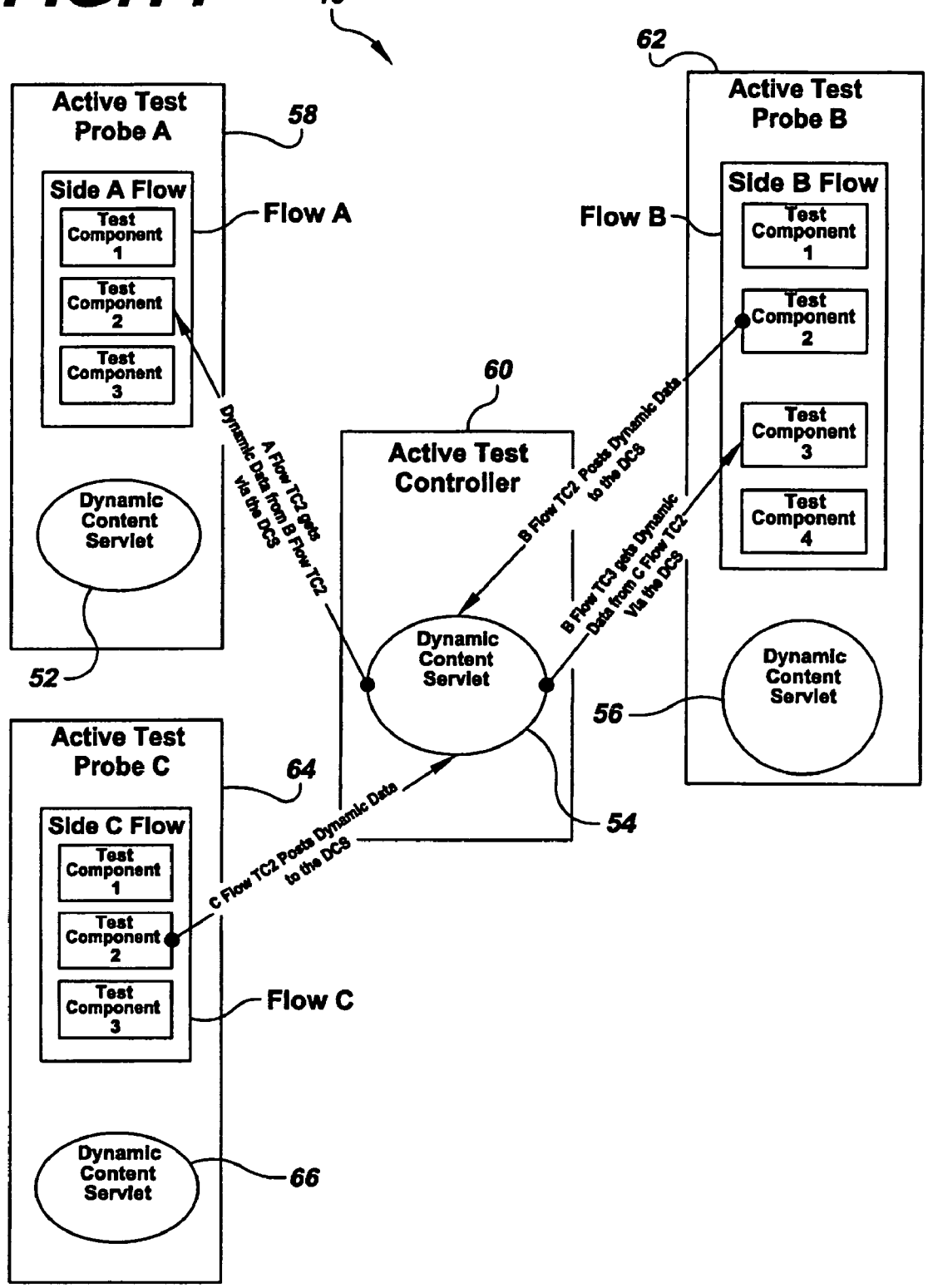
FIG. 14 is another block diagram illustrating a portion of a system performing dynamic data exchange in accordance with an embodiment of the present invention.

FIG. 14 shows another portion of an embodiment of the present invention, where three Flows A, B and C are initiated concurrently. Execution of Test Component 2 in Flow B causes Flow B to generate dynamic data that are required for Test Component 2 in Flow A to be successfully executed. Once generated in Test component 2 of Flow B, such dynamic data are posted from Flow B to dynamic data content servlet 54. When Flow A has proceeded to Test Component 2, the dynamic data content residing on sync servlet 54 is retrieved by Test Component 2 in Flow A. Dynamic data generated in Test component 2 of Flow C are posted from Flow C to dynamic data content servlet 54. When Flow B has proceeded to Test Component 3, the dynamic data content residing on sync servlet 54 is retrieved by Test Component 3 in Flow B. Flows A, B and C may now proceed to complete execution, the necessary dynamic data content having been shared or transferred between or among Flows A, B and C.

Figure 15:
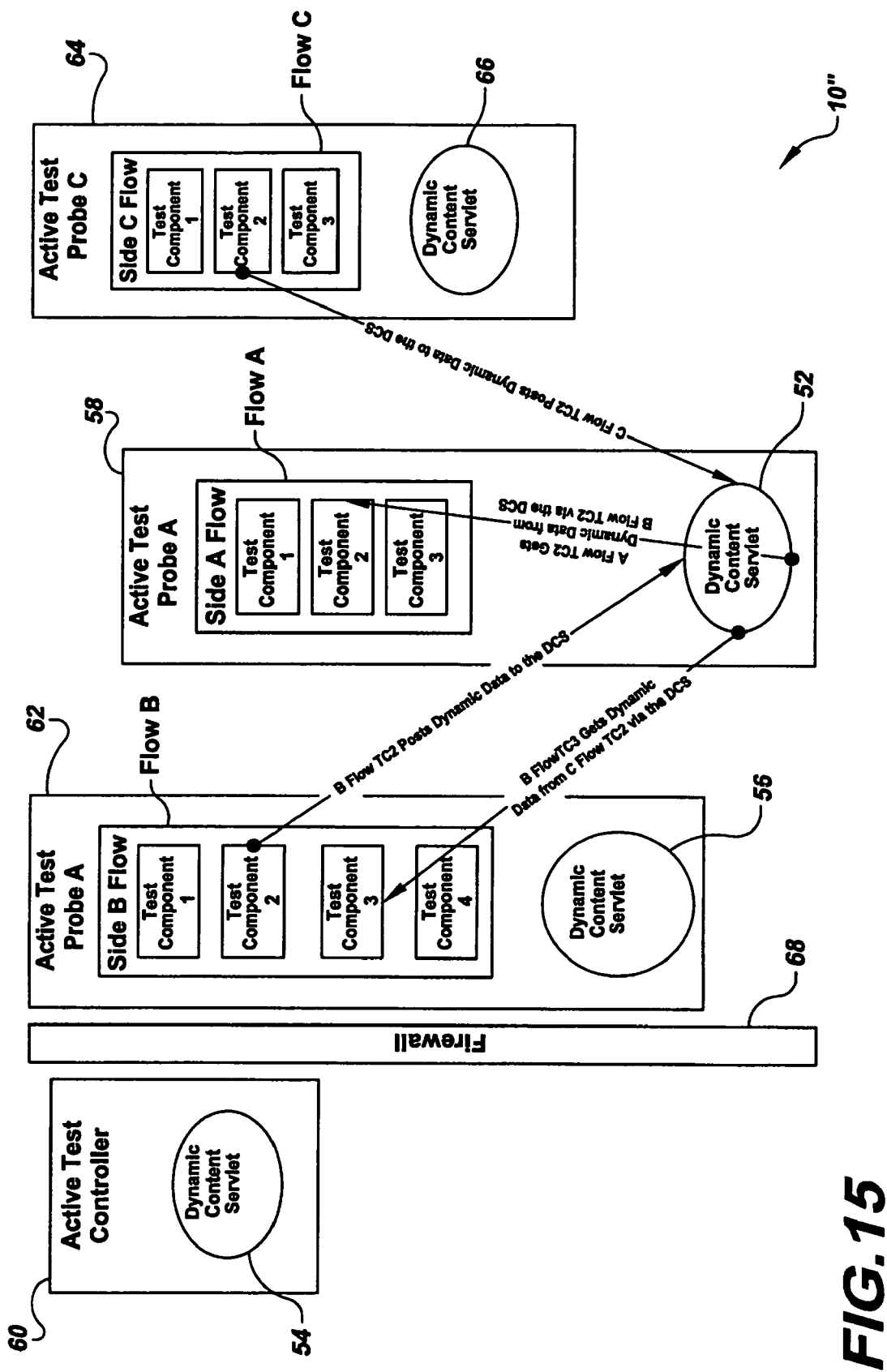
FIG. 15 is yet another block diagram illustrating a portion of a system performing dynamic data exchange in accordance with an embodiment of the present invention.

FIG. 15 shows another portion of an embodiment of the present invention, where firewall 68 is disposed between Active Test controller 60 and Flows A, B and C. Flows A, B and C are initiated concurrently. Each flow runs its first test component. Because firewall 68 is disposed between Active Test Controller 60 and Active Test Probes 58, 62 and 64, however, dynamic data content servlet 54 may not be used. Nevertheless, in the embodiment of the present invention shown in FIG. 15, any dynamic data content servlet may be accessed by any of Active Test Probes 58, 62 or 64, thereby rendering system 10" operative. In FIG. 15, dynamic data content servlet 52 of Active Test Probe 58 is employed to fulfill such a function.

In FIG. 15, execution of Test Component 2 in Flow B causes Flow B to generate dynamic data that are required for Test Component 2 in Flow A to be successfully executed.

Once generated in Test component 2 of Flow B, such dynamic data are posted from Flow B to dynamic data content servlet 52. When Flow A has proceeded to Test Component 2, the dynamic data content residing on sync servlet 52 is retrieved by Flow A. Execution of Test Component 2 in Flow C causes Flow C to generate dynamic data that are required for Test Component 3 in Flow B to be successfully executed. Once generated in Test component 3 of Flow C, such dynamic data are posted from Flow C to dynamic data content servlet 52. When Flow B has proceeded to Test Component 3, the dynamic data content residing on sync servlet 52 is retrieved by Test Component 3 in Flow B. Flows A, B and C may now proceed to complete execution, the necessary dynamic data content having been shared or transferred between or among Flows A, B and C.

CONCLUSION

The distributed and automated test administration architecture has many benefits. The system integrates seamlessly into graphical environments that provide the ability to create test sequences, such as WQM. Expertise required to install and maintain systems based on such systems is more readily available than for proprietary systems. The system reduces installation time since the platforms on which software runs, such as web servers and Java Servlet containers are already installed in the wireless application providers' networks. The system can easily be configured to perform resource management utilizing open, standardized protocols for communication. For example, the separate, but coordinated flows that formulate a test may require associated and reservable resources, which must be exclusively allocated to test execution runs. Examples of such resources include mobile interfaces for wireless communication, or dedicated serial links. Allocation of such resources is preferably accomplished by the inventive system prior to test execution through the centralized active test controller, also through standard, open protocols. This applies to device management for communication access, user profile assignment, or any other resources that might be required. If the test being executed does not require resource allocation, the invention does not require up-front resource management. The invention also takes advantage of multithreading and/or multi-process capabilities of the host systems to allow dynamic data exchange between flows while other test execution steps are taking place, offering the ability to execute more sophisticated test scenarios (or execute them more easily) than existing test systems.

Although the invention has been described with respect to various embodiments, it should be realized this invention is also capable of a wide variety of further and other embodiments within the spirit of the invention.

It is claimed:

1. A method of performing multi-location testing in a system having a test controller and at least a first flow at a first remote location and a second flow at a second remote location, comprising the steps of:
   creating a graphical representation of a multi-flow test that synchronizes at least the first flow and the second flow among agents at multiple remote locations;
   converting the graphical representation into a textual representation in an open communication standard format;
   reading the textual representation to identify at least the first flow and an associated first remote location, the second flow and an associated second remote location, resources required to execute the flows, and the remote locations of the agents that control the resources required to execute the flows;
   sending to at least a first test session server at the first remote location and a second test session server at the second remote location, descriptions of the respective sequences of tests comprising the first flow and the second flow in an open communications standard format;
   substantially simultaneously initiating at least the first flow and the second flow;
   synchronizing at least the first flow and the second flow for concurrent execution; and
   returning test results upon completion of at least the first flow and the second flow.

2. The method of claim 1, wherein the synchronizing step further comprises sending control messages between or among multi-sided test components comprising at least the first flow and the second flow, respectively, the control messages permitting the flows to implicitly exchange timing synchronization information and dynamically-generated data.

3. The method of claim 1, wherein at least the first flow and the second flow run independently from a master flow.

4. The method of claim 1, wherein the synchronizing step further comprises:
   pausing execution in at least one of the first flow and the second flow;
   sending, from the flow not paused, a synchronization signal to a sync server;
   requesting, from the paused flow to the sync server, permission to resume execution;
   upon receipt of the synchronization signal by the sync server, granting permission to the paused flow to resume execution; and
   resuming execution of the paused flow.

5. The method of claim 1, wherein the system does not include a proprietary interface.

6. The method of claim 1, wherein an open common communication standard for data transfer is employed to effect synchronization of flows.

7. The method of claim 1, wherein the synchronizing step further comprises:
   generating, in at least one of the first flow and the second flow, dynamic data;
   posting, using at least one open common communication standard, the dynamic data to a dynamic content server to form posted dynamic data;
   requesting, from at least one of the first flow and the second flow to the dynamic content server, the posted dynamic data; and
   sending, from the dynamic content server, the posted dynamic data to the flow requesting the posted dynamic data.

8. A system for performing multi-location testing including at least a first flow at a first remote location and a second flow at a second remote location, comprising:
   means for creating a graphical representation of a multi-flow test that synchronizes at least the first flow and the second flow among agents at multiple remote locations;
   means for converting the graphical representation into a textual representation in an open communication standard format;
   means for reading the textual representation to identify at least the first flow and an associated first remote location, the second flow and an associated second remote location, resources required to execute the flows, and the remote locations of the agents that control the resources required to execute the flows;

means for sending to at least a first test session server at the first remote location and a second test session server at the second remote location, descriptions of the respective sequences of tests comprising the first flow and the second flow in an open communications standard format;

means for substantially simultaneously initiating at least the first flow and the second flow;

means for synchronizing at least the first flow and the second flow for concurrent execution; and means for returning test results upon completion of at least the first flow and the second flow.

9. The system of claim 8, wherein the synchronizing means further comprises means for sending control messages between or among multi-sided test components comprising at least the first flow and the second flow, respectively, the control messages permitting the flows to implicitly exchange timing synchronization information and dynamically-generated data.

10. The system of claim 8, wherein at least the first flow and the second flow run independently from a master flow.

11. The system of claim 8, wherein the synchronizing means further comprises:
   means for pausing execution in at least one of the first flow and the second flow;
   means for sending, from the flow not paused, a synchronization signal to a sync server;
   means for requesting, from the paused flow to the sync server, permission to resume execution;
   upon receipt of the synchronization signal by the sync server, granting permission to the paused flow to resume execution; and
   means for resuming execution of the paused flow.

12. The system of claim 8, wherein the system does not include a proprietary interface.

13. The system of claim 8, wherein an open common communication standard for data transfer is employed to effect synchronization of flows.

14. The system of claim 8, wherein the synchronizing means further comprises:
   means for generating, in at least one of the first flow and the second flow, dynamic data;
   means for posting, using at least one open common communication standard, the dynamic data to a dynamic content server to form posted dynamic data;
   means for requesting, from at least one of the first flow and the second flow to the dynamic content server, the posted dynamic data; and
   means for sending, from the dynamic content server, the posted dynamic data to the flow requesting the posted dynamic data.

15. A processor-readable computer program product encoded on one or more programmable storage devices, the computer program product executable by one or more processors to perform method steps for performing multi-location testing in a system having a test controller and at least a first flow at a first remote location and a second flow at a second remote location, comprising instructions for:
   creating a graphical representation of a multi-flow test that synchronizes at least the first flow and the second flow among agents at multiple remote locations;
   converting the graphical representation into a textual representation in an open communication standard format;
   reading the textual representation to identify at least the first flow and an associated first remote location, the second flow and an associated second remote location, resources required to execute the flows, and the remote locations of the agents that control the resources required to execute the flows;
   sending to at least a first test session server at the first remote location and a second test session server at the second remote location, descriptions of the respective sequences of tests comprising the first flow and the second flow in an open communications standard format;
   substantially simultaneously initiating at least the first flow and the second flow;
   synchronizing at least the first flow and the second flow for concurrent execution; and
   returning test results upon completion of at least the first flow and the second flow.

16. The computer program product of claim 15, wherein the instructions for executing the synchronizing step further comprise instructions for sending control messages between or among multi-sided test components comprising at least the first flow and the second flow, respectively, the control messages permitting the flows to implicitly exchange timing synchronization information and dynamically-generated data.

17. The computer program product of claim 15, wherein at least the first flow and the second flow run independently from a master flow.

18. The computer program product of claim 15, wherein the instructions for executing the synchronizing step further comprise instructions for:
   pausing execution in at least one of the first flow and the second flow;
   sending, from the flow not paused, a synchronization signal to a sync server;
   requesting, from the paused flow to the sync server, permission to resume execution;
   upon receipt of the synchronization signal by the sync server, granting permission to the paused flow to resume execution; and
   resuming execution of the paused flow.

19. The computer program product of claim 15, wherein an open common communication standard for data transfer is employed to effect synchronization of flows.

20. The computer program product of claim 15, wherein the instructions for executing the synchronizing step further comprise instructions for:
   generating, in at least one of the first flow and the second flow, dynamic data;
   posting, using at least one open common communication standard, the dynamic data to a dynamic content server to form posted dynamic data;
   requesting, from at least one of the first flow and the second flow to the dynamic content server, the posted dynamic data; and
   sending, from the dynamic content server, the posted dynamic data to the flow requesting the posted dynamic data.

* * * * *